United States Patent
Mason

[15] 3,676,523
[45] July 11, 1972

[54] ALPHA-OLEFIN PRODUCTION

[72] Inventor: Ronald F. Mason, Mill Valley, Calif.
[73] Assignee: Shell Oil Company, New York, N.Y.
[22] Filed: July 16, 1971
[21] Appl. No.: 163,448

[52] U.S. Cl. .................... 260/683.15D, 252/428, 252/429 B, 260/94.9 CB
[51] Int. Cl. .......................................................... C07c 3/10
[58] Field of Search ...................... 260/683.15 D, 94.9 CB; 252/429 B, 432, 428

[56] References Cited

UNITED STATES PATENTS

| | | | |
|---|---|---|---|
| 3,151,155 | 4/1964 | Luttinger | 260/683.15 X |
| 3,558,736 | 1/1971 | Bergem et al. | 260/683.15 |

*Primary Examiner*—Paul M. Coughlan, Jr.
*Attorney*—Howard W. Haworth et al.

[57] ABSTRACT

Ethylene is oligomerized to linear, alpha-olefins by reacting ethylene in liquid phase solution in the presence of a catalyst composition produced by contacting in the presence of ethylene (1) a simple divalent nickel salt (2) a boron hydride reducing agent and (3) an o-dihydrocarbylphosphinobenzoic acid or alkali metal salt thereof.

10 Claims, No Drawings

ALPHA-OLEFIN PRODUCTION

BACKGROUND OF THE INVENTION

1. Field of the Invention

The present invention relates to the production of linear alpha-olefins which are compounds of established utility in a variety of applications. Such olefins, particularly $C_{12}-C_{20}$, are converted by treatment with sulfur trioxide to alpha-olefin sulfonates, which are useful as biodegradable detergents. Alternatively, such olefins are converted to the corresponding alcohols as by conventional "Oxo" processes or sulfuric acid catalyzed hydration. The $C_{12}-C_{20}$ alcohols thus produced are ethoxylated with ethylene oxide in the presence of a basic catalyst, e.g., sodium hydroxide, to form conventional detergents and lower molecular weight alcohols are esterified with polyhydric acids, e.g., phthalic acid, to form plasticizers for polyvinyl chloride.

2. Description of Prior Art

Catalysts useful for the conversion of ethylene to linear alpha-olefins are known. For example, co-pending U.S. Ser. No. 874,377 of Keim et al., common assignee, filed Nov. 5, 1969, discloses a class of polymerization catalyst which comprises a nickel chelate produced by contacting a zero-valent nickel compound, e.g., bis-1,5-cyclooctadienenickel(0), and a phosphino-substituted carboxylic acid, e.g., diphenylphosphinobenzoic acid. A related process of Singleton et al, co-pending U.S. Ser. No. 94,589, common assignee, filed Dec. 2, 1970, employs a catalyst composition produced by contacting a zero-valent nickel compound, e.g., bis-1,5-cyclooctadienenickel(0) and a dihydrocarbylphosphino substituted benzoic acid, e.g., o-(methylphenylphosphino)benzoic acid. Although such catalysts are generally satisfactory, it would be of advantage to develop catalysts which do not require the use of thermally and oxidatively unstable and expensive catalyst precursors such as zero-valent nickel compounds.

Catalyst compositions produced by contacting a complex of a stable divalent nickel salt, e.g., bis(triphenylphosphine)nickel dichloride, and a hydridic reducing agent such as sodium borohydride, are disclosed by Luttinger, *J. Org. Chem.*, 27, 1591 (1962). Although such catalyst compositions avoid the use of expensive and unstable zero-valent nickel compounds, they polymerize ethylene to high molecular weight polyethylene.

SUMMARY OF THE INVENTION

It has now been found that an improved process of oligomerizing ethylene to linear alpha-olefins is obtained by reacting ethylene in liquid phase solution in the presence of a catalyst composition produced by contacting in a polar organic solvent in the presence of ethylene (1) a simple divalent nickel salt (2) a boron hydride reducing agent and (3) an o-dihydrocarbylphosphinobenzoate ligand. The process is characterized by ethylene conversion to a linear alpha-olefin product mixture of relatively high proportion of olefinic products in the higher molecular range, e.g., $C_{12}-C_{20}$ alpha-olefins.

DESCRIPTION OF PREFERRED EMBODIMENTS

Nickel Salts: In general, any simple divalent nickel salt can be employed for preparing the catalyst composition of the invention provided the nickel salt is sufficiently soluble in the reaction medium. By the term "simple divalent" nickel salt is meant a nickel atom having a formal valence of +2 and bonded through ionic or electrovalent linkages to two singly charged anionic groups (e.g., halides) or to one doubly charged anionic group (e.g., carbonate) and not complexed with or coordinated to any other additional molecular or ionic species. Simple divalent nickel salts therefore do not encompass complex divalent nickel salts which are bonded to one or two anionic groups and additionally complexed or coordinated to neutral chelating ligands or groups such as carbon monoxide and phosphines. However, simple divalent nickel salts are meant to include nickel salts containing water of crystallization in addition to one or two anionic groups.

In most instances, a simple divalent nickel salt with a solubility in the reaction diluent or solvent employed for catalyst preparation of at least 0.001 mole per liter (0.001M) is satisfactory for use as the nickel catalyst precursor. A solubility in the reaction diluent or solvent of at least 0.01 mole per liter (0.01M) is preferred, and a solubility of at least 0.05 mole per liter (0.05M) is most preferred. Reaction diluents and solvents suitably employed for catalyst preparation are the polar organic solvent suitably employed for the oligomerization process which solvents are defined below.

Suitable simple divalent nickel salts include inorganic as well as organic divalent nickel salts. Illustrative inorganic nickel salts are nickel halides such as nickel chloride, nickel bromide and nickel iodide, nickel carbonate, nickel chlorate, nickel ferrocyanide, and nickel nitrate. Illustrative organic divalent nickel salts are nickel salts of carboxylic acids such as nickel alkanoates of up to ten carbon atoms, preferably of up to six carbon atoms, e.g., nickel formate, nickel acetate, nickel propionate, nickel hexanoate and the like; nickel oxalate; nickel benzoate and nickel naphthenate. Other suitable organic salts include nickel benzenesulfonate, nickel citrate, nickel dimethylglyoxime and nickel acetylacetonate.

Nickel halides, especially nickel chloride, and nickel alkanoates, in part because of their availability at low cost and solubility in polar organic solvents, are preferred nickel salts.

Dihydrocarbylphosphinobenzoic Acid: The o-dihydrocarbylphosphino-benzoate ligands employed in the preparation of the catalyst composition of the invention generally have from eight to 30 carbon atoms, but preferably from 14 to 20 carbon atoms, and are represented by the formula (I):

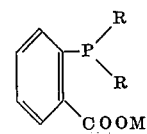

wherein R is a monovalent hydrocarbyl group and M is hydrogen or an alkali metal. The M group is preferably hydrogen, sodium or potassium.

Illustrative of suitable R groups are hydrocarbon alkyl R groups such as methyl, ethyl, isobutyl, lauryl, stearyl, cyclohexyl, and cyclopentyl; hydrocarbon alkenyl R groups having aromatic substituents such as benzyl, phenylcyclohexyl, and phenylbutenyl. Aromatic R groups such as phenyl, tolyl, xylyl and p-ethylphenyl. Preferred R groups are aromatic groups of six to ten carbon atoms, especially phenyl, and cycloalkyl of five to ten carbon atoms, especially cyclohexyl.

Illustrative o-dihydrocarbylphosphinobenzate ligands of formula (I) are o-diphenylphosphinobenzoic acid, o-(methylphenylphosphino)benzoic acid, o-(ethyltolylphosphino)benzoic acid, o-dicyclohexylphosphinobenzoic acid, o-(cyclohexylphenylphosphino)benzoic acid, o-dipentylphosphinobenzoic acid and the alkali metal salts thereof.

Preferred benzoate ligands of formula (I) are those wherein the R groups are aromatic or cycloalkyl of six to ten carbon atoms, particularly diarylphosphinobenzoic acids, arylcycloalkylphosphinobenzoic acids and the alkali metal salts thereof. Such aryl- and cycloalkyl-substituted phosphino-benzoate ligands are preferred largely because catalyst compositions prepared therefrom catalyze the oligomerization of ethylene to a product mixture containing a high proportion of oligomers in the useful $C_{12}-C_{20}$ carbon range.

Although the o-dihydrocarbylphosphinobenzoate ligands are suitably employed as the free acid, better results are occassionally obtained with the alkali metal salts of the o-dihydrocarbylbenzoic acid. The alkali metal salts are suitably preformed from the benzoic acid by treatment with an alkali metal hydroxide or oxide solution prior to catalyst preparation or, alternatively, the carboxylic acid salt is generated in situ by the reaction of equimolar amounts of the carboxylic acid and an alkali metal hydroxide during catalyst preparation.

When preparing the catalyst, the molar ratio of nickel salt to benzoate ligand (free acid or salt thereof) is at least 1:1, i.e., at least one mole nickel salt is provided for each mole of benzoate ligand. Suitable molar ratios of nickel salt to benzoic acid ligand (or salt thereof) range from 1:1 to 5:1, although molar ratios of about 1.5:1 to 3:1 are preferred.

Boron Hydride Reducing Agent: In general, any boron hydride salt reducing agent of reasonable purity is suitable for use in the process of the invention. Specific examples include alkali metal borohydrides such as sodium borohydrides, potassium borohydride and lithium borohydride; alkali metal alkoxyborohydrides wherein each alkoxy has one to four carbon atoms, such as sodium trimethoxyborohydride and potassium tripropoxyborohydride and tetraalkylammonium borohydrides wherein each alkyl has one to four carbon atoms, such as tetraethylammonium borohydride. Largely because of commercial availability, alkali metal borohydrides are preferred and especially preferred is sodium borohydride.

When preparing the catalyst, the molar ratio of boron hydride salt to nickel salt is at least 1:1. There does not appear to be a definite upper limit on the boron hydride/nickel ratio, but for economic reasons it is especially preferred that the molar ratio be not greater than 15:1. The preferred molar ratio boron hydride to nickel salt is usually between about 1:1 and about 10:1. Best results are often obtained when the molar ratio is about 2:1.

Catalyst Preparation: The catalyst composition of the present invention is suitably preformed by contacting the catalyst precursors i.e., the nickel salt, the benzoate ligand and the boron hydride reducing agent, in the presence of ethylene in a polar organic diluent or solvent, e.g., polar organic diluents or solvents employed for the oligomerization process which are not reduced by the boron hydride reducing agent. In a preferred modification, the solvent, the nickel salt and the benzoate ligand are contacted in the presence of ethylene before the addition of the boron hydride reducing agent. In order to obtain the improved catalyst of the invention, however, it is essential that the catalyst composition is prepared in the presence of the ethylene reactant. Generally, the catalyst precursors are contacted under 10 to 1,500 psig of ethylene.

By any modification, the catalyst is generally prepared at temperatures of about 0°C to 50°C, although substantially ambient temperatures, e.g., 10°–30°C, are preferred. Contact times of about 5 minutes to 1 hour are generally satisfactory.

Reaction Conditions: The ethylene is contacted with the catalyst composition in the liquid phase in the presence of a reaction solvent or diluent which is liquid at reaction temperature. Amounts of diluent or solvent of up to about 30 liters per mole of ethylene are satisfactorily employed. Generally, the concentration of the catalyst, calculated as nickel metal, in the solvent or diluent is at least 0.001M, but preferably from about 0.01M to 0.05M.

Suitable solvents or diluents are non-polar organic solvents such as aliphatic hydrocarbons, e.g., alkanes, including cycloalkanes of from 5 to 20 carbon atoms, such as cyclopentane, cyclohexane, isohexane, heptane, isoctane, decane, and eicosane; halo-alkanes, e.g., ethylene dichloride, hexachloroethane, 1,4-dichlorobutane; halocyclo-alkanes, e.g., chlorocyclohexane; aromatic compounds such as benzene, toluene and xylene; and haloaromatics such as chlorobenzene and hexafluorobenzene.

Other suitable solvents or diluents are polar organic compounds such as organic compounds containing atoms such as oxygen, sulfur, nitrogen and phosphorus incorporated in functional groups such as hydroxy, alkoxy, aryloxy, carbalkoxy, alkanoyloxy, cyano, amino, alkylamino, dialkylamine, amide, N-alkylamide, N,N-dialkylamide, sulfonylalkyl and like functional groups. Illustrative oxygenated organic solvents are fully esterified polyacyl esters of polyhydroxy alkanes such as glycerol triacetate, tetraacyl esters of erythritol, diethylene glycol diacetate; monoesters such as ethyl acetate, butyl propionate and phenyl acetate; cycloalkyl ethers, e.g., dioxane, tetrahydrofuran, and tetrahydropyran; acyclic alkyl ethers, e.g., dimethoxyethane, diethylene glycol dimethyl ether and dibutyl ether; aromatic ethers such as anisole, 1,4-dimethoxybenzene and p-methoxytoluene; aliphatic alcohols such as methanol, trifluoroethanol, hexafluoroethanol, trifluoropropanol, secbutanol, perfluorobutanol, octanol, dodecanol, cycloalkanols, e.g., cylcopentanol, and cyclo-hexanol; polyhydric acyclic hydroxyalkanes such as glycerol and trimethylene glycol, alkanediols of two to ten carbon atoms such as ethylene glycol, propylene glycol, 1,4-butanediol and 2,5-hexanediol; phenols, such as cresol, p-chlorophenol, m-bromophenol, 2,6-dimethylphenol, p-methoxyphenol, 2,4-dichlorophenol; and alkylene carbonates such as ethylene carbonate, propylene carbonate and butylene carbonate. Illustrative nitrogen-containing organic solvents are nitriles, e.g., acetonitrile and propionitrile; amines, e.g., butylamine, dibutylamine, trihexylamine, N-methylpyrolidine, N-methylpiperidine, and aniline; N,N-dialkylamides, e.g., N,N-dimethylformamide and N,N-dimethylacetamine. Illustrative sulfur-containing solvents are sulfolane and dimethylsulfoxide and illustrative phosphorus-containing solvents are trialkylphosphate, e.g., trimethylphosphate, triethylphosphate and tributylphosphate and hexaalkylphosphoramides such as hexamethylphosphoramide.

Preferred reaction diluents and solvents are polar organic solvents, particularly oxygenated organic solvents. Especially preferred are alkanediols of four to six carbon atoms, e.g., 1,4--butanediol and 2,5-hexanediol.

Polar organic solvents and diluents are preferred for use in the process in part because the ethylene oligomerization product mixture is essentially insoluble in such solvents and diluents. For example, when a polar organic solvent such as an alkanediol is employed, a two phase reaction mixture is formed, i.e., one phase comprising the ethylene oligomerization product mixture, i.e., the alpha-olefins, and a second phase comprising the nickel catalyst and the reaction diluent or solvent. Where a two phase reaction is formed, the ethylene oligomerization product phase is separated and the catalyst containing diluent or solvent phase is utilized for further ethylene oligomerization. Polar organic solvents are also preferred in part because the same solvents are employed in catalyst preparation as defined above.

The precise method of establishing ethylene/catalyst contact during the oligomerization reaction is not critical. In one modification, the catalyst composition and the solvent are charged to an autoclave or similar pressure reactor, the ethylene is introduced, and the reaction mixture is maintained with agitation at reaction temperature and pressure for the desired reaction period. In the modification wherein a polar organic solvent is employed and a two phase reaction is formed, ethylene is passed in a continuous manner into a reaction zone containing the catalyst composition and the diluent while ethylene oligomerization product mixture which is produced is concomitantly withdrawn from the reaction zone.

By any modification, the oligomerization process is conducted at moderate temperatures and pressures. Suitable reaction temperatures vary from about 25° to 150°C, but preferably from about 50° to 90°C. The reaction is conducted at or above atmosphere pressure. The precise pressure is not critical so long as the reaction mixture is maintained substantially in a liquid phase. Typical pressures vary from about 10 psig to 5,000 psig with the range from about 400 psig to 1,500 psig being preferred.

The oligomerization products are separated and recovered from the reaction mixture by conventional methods such as fractional distillation, selective extraction, adsorption and the like. The reaction solvent, catalyst and any unreacted ethylene are recycled for further utilization. Spent catalyst, i.e., catalyst no longer active for ethylene oligomerization, is regenerated by reacting with additional boron hydride reducing agent and nickel salt in the molar ratios (based on benzoate ligand) hereinbefore defined. No additional benzoate ligand is required to regenerate the spent catalyst.

ILLUSTRATIVE EMBODIMENTS 1-4

A series of ethylene oligomerization reactions was conducted with a nickel catalyst prepared by reacting nickel chloride hexahydrate ($NiCl_2 \cdot 6H_2O$), potassium salt of a dihydrocarbylphosphinobenzoic acid and sodium borohydride in a reaction medium of 1,4-butanediol and ethylene. Each reaction was conducted by charging 0.25 millimoles $NiCl_2 \cdot 6H_2O$, 0.125–0.25 millimoles of the indicated dihydrocarbylphosphinobenzoate ligand, 65 ml 1,4-butanediol and 500 psig of ethylene to a 300 ml Magnedrive autoclave. After the autoclave was maintained at 25°C for 15 minutes, 0.50 millimoles of sodium borohydride (0.5 molar solution in N,N-dimethylacetamide) and an additional 250 psig of ethylene (total ethylene pressure of 750 psig) were charged to the autoclave. The autoclave was maintained at 25°C for 15 minutes and then heated to 75°C and maintained at a pressure of 750 psig by continual addition of ethylene until ethylene uptake ceased. The molar ratio of nickel to benzoate ligand, the molar ratio of sodium borohydride to nickel chloride, the rate of oligomer formation (measured over the first 75 minutes), total grams of oligomers produced per gram of nickel, and the percent weight of oligomer products in the $C_{12}$–$C_{20}$ carbon range are provided in Table I as Runs 1–3.

Gas liquid chromatographic analysis of the $C_{12}$ fraction of the oligomers produced in Runs 1–2 showed that the $C_{12}$ olefins consisted of about 98 percent linear α-olefins, about 1 percent linear internal olefins and about 1 percent branched olefins.

ILLUSTRATIVE EMBODIMENT 5

Illustrative embodiment 1 was repeated, except that the catalyst was prepared from diphenylphosphinobenzoic acid instead of the potassium salt of diphenylphosphinobenzoic acid and that the ethylene pressure was 1,100 psig. The rate of oligomer formation was 490 grams oligomers per gram nickel per hour. The oligomer products consisted of 32.5%w $C_{12}$–$C_{20}$ oligomers. The results are tabulated in Table I as Run 5.

ILLUSTRATIVE EMBODIMENT 6

Illustrative embodiment 1 was repeated except that the catalyst was prepared from nickel acetate tetrahydrate instead of nickel chloride and that the ethylene pressure was 1,100 psig. Oligomers were formed at a rate of 1,200 grams per gram nickel per hour (over first 75 minutes). The oligomer products consisted of 24%w $C_{12}$–$C_{20}$ oligomers. The results are tabulated in Table I as Run 6.

TABLE I

| Run | Nickel salt or complex | Ligand ϕ=phenyl | Ratio Ni/ligand (moles) | Ratio $NaBH_4$/Ni (moles) | Gram oligomer/ gram Ni/hour | Gram oligomer/ gram Ni | Yield $C_4$ | $C_6$–$C_{10}$ | $C_{12}$–$C_{20}$ |
|---|---|---|---|---|---|---|---|---|---|
| 1 | $NiCl_2 \cdot 6H_2O$ | ϕ₂P-C₆H₄-COOK | 2 | 2 | 150 | 750 | 8.0 | 29.0 | 36.0 |
| 2 | $NiCl_2 \cdot 6H_2O$ | ϕ₂P-C₆H₄-COOK | 1 | 2 | 750 | 4,500 | 25.5 | 51.0 | 22.0 |
| 3 | $NiCl_2 \cdot 6H_2O$ | ϕ(cyclohexyl)P-C₆H₄-COOK | 2 | 2 | 70 | 1,500 | 12.0 | 36.5 | 35.0 |
| 4 | $NiCl_2 \cdot 6H_2O$ | ϕ(CH₃)P-C₆H₄-COOK | 2 | 2 | 450 | 3,250 | 33.5 | 52.0 | 14.0 |
| 5 | $NiCl_2 \cdot 6H_2O$ | ϕ₂P-C₆H₄-COOH | 2 | 2 | 490 | ---- | 5.0 | 21.0 | 32.5 |
| 6 | $Ni(OOCCH_3)_2 \cdot 4H_2O$ | ϕ₂P-C₆H₄-COONa | 2 | 2 | 1,200 | ---- | 23.0 | 49.0 | 24.0 |

I claim as my invention:

1. A process of oligomerizing ethylene to linear, alpha-olefins by reacting ethylene in liquid phase solution at a temperature of about 25°C to 150°C in the presence of a catalyst composition produced by contacting in a polar organic solvent in the presence of ethylene (1) a simple divalent nickel salt having a solubility of at least 0.001 mole per liter in said polar organic solvent (2) a boron hydride reducing agent and (3) a ligand selected from o-dihydrocarbylphosphinobenzoic acid and alkali metal salt thereof, the molar ratio of nickel salt to o-dihydrocarbylphosphinobenzoic acid or alkali metal salt thereof being from about 1:1 to 5:1.

2. The process of claim 1 wherein the catalyst composition is produced in the presence of about 10 psig to 1500 psig of ethylene at a temperature of about 0° to 50°C and the nickel salt has a solubility of at least 0.01 mole per liter in said polar organic solvent.

3. The process of claim 2 wherein the ethylene oligomerization reaction is conducted in the same polar organic solvent employed for catalyst preparation.

4. The process of claim 3 wherein boron hydride reducing agent is an alkali metal borohydride and the molar ratio of alkali metal borohydride to nickel salt is about 1:1 to 10:1.

5. The process of claim 4 wherein the ligand is an o-diarylphosphino-benzoic acid or alkali metal salt thereof.

6. The process of claim 5 wherein the nickel salt is a nickel halide.

7. The process of claim 6 wherein the polar organic solvent is an alkanediol of four to six carbon atoms.

8. The process of claim 7 wherein the nickel halide is nickel chloride, the ligand is o-diphenylphosphinobenzoic acid or alkali metal salt thereof, the boron hydride reducing agent is sodium borohydride and the polar organic solvent is 1,4-butanediol.

9. The process of claim 4 wherein the ligand is an arylcycloalkylbenzoic acid or alkali metal salt thereof.

10. The process of claim 9 wherein the polar organic solvent is an alkanediol of four to six carbon atoms, the nickel salt is a nickel halide and the boron hydride reducing agent is sodium borohydride.

* * * * *